United States Patent [19]
Dailey

[11] Patent Number: 4,629,053
[45] Date of Patent: Dec. 16, 1986

[54] CLOSED LOOP MACHINING SYSTEM

[75] Inventor: Frank E. Dailey, Milwaukee, Wis.

[73] Assignee: Kearney & Trecker Corporation, Milwaukee, Wis.

[21] Appl. No.: 249,931

[22] Filed: Apr. 1, 1981

Related U.S. Application Data

[63] Continuation of Ser. No. 965,191, Nov. 30, 1978, abandoned, which is a continuation-in-part of Ser. No. 786,020, Apr. 8, 1977, abandoned.

[51] Int. Cl.⁴ .............................................. B65G 37/00
[52] U.S. Cl. .............................. 198/346.1; 198/465.2; 198/748
[58] Field of Search ............... 198/339, 472, 580, 648, 198/738, 747, 748, 344, 345, 346.1, 465.1, 465.2, 803.01; 104/162, 176; 29/33 P, 563; 414/222

[56] References Cited

U.S. PATENT DOCUMENTS

| | | | |
|---|---|---|---|
| 3,343,645 | 9/1967 | Doerfling | 198/345 |
| 3,729,083 | 4/1973 | Wollenhaupt et al. | 198/345 |
| 3,825,245 | 7/1974 | Osburn et al. | 29/563 X |
| 3,914,853 | 10/1975 | Jauch | 29/563 X |
| 3,931,882 | 1/1976 | Ossbahr | 198/648 |
| 3,934,375 | 1/1976 | Hornstein | 198/345 |
| 4,070,972 | 1/1978 | Folsom et al. | 198/738 |
| 4,116,324 | 9/1978 | Burmeister | 198/472 |

FOREIGN PATENT DOCUMENTS

| | | | |
|---|---|---|---|
| 2292553 | 6/1976 | France . | |
| 121810 | 12/1958 | U.S.S.R. | 104/162 |
| 384758 | 12/1973 | U.S.S.R. | 198/748 |

Primary Examiner—Joseph E. Valenza
Attorney, Agent, or Firm—Quarles & Brady

[57] ABSTRACT

Three machine tools are positioned in spaced apart relationship at the corners of a triangle. Each machine tool has a worktable which is rotatably mounted on a corresponding bed for rotation about a corresponding vertical axis. Each worktable has guide means for slidably receiving a pallet carrying one or more workpieces. At least three workpiece transfer units are each positioned adjacent to the worktable of a corresponding machine tool for interaction therewith. Each workpiece transfer unit has guide means for slidably receiving a pallet and has a hydraulically actuated slide which engages the pallet and moves it along the guide means to transfer the pallet from one machine tool to the adjacent machine tool. One or more workpieces are clamped on each pallet. The pallets are introduced into the loop at an operator's station. The pallets carrying the workpieces are transferred from one machine tool to the next around the loop, having work performed on the workpieces at each machine tool, and finally, being returned to the operator's station for unloading.

2 Claims, 13 Drawing Figures

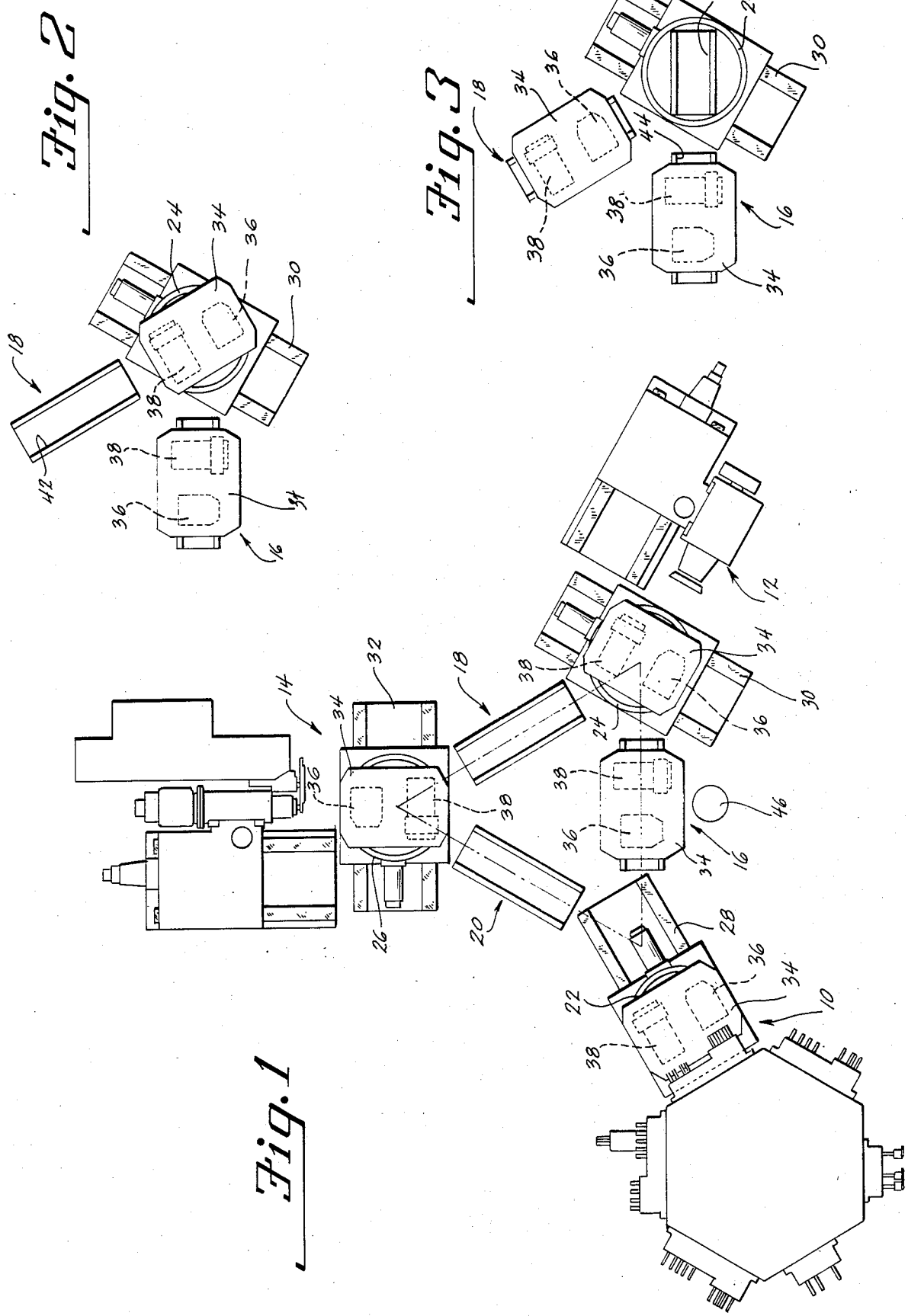

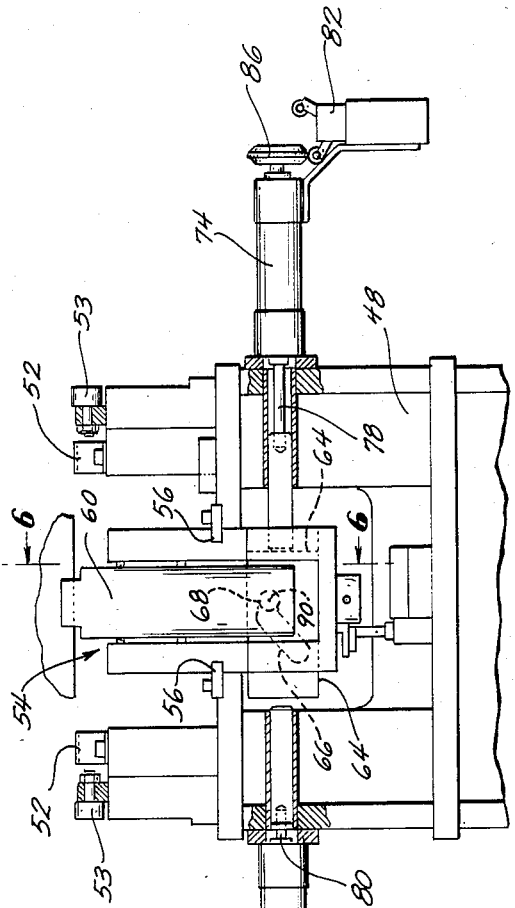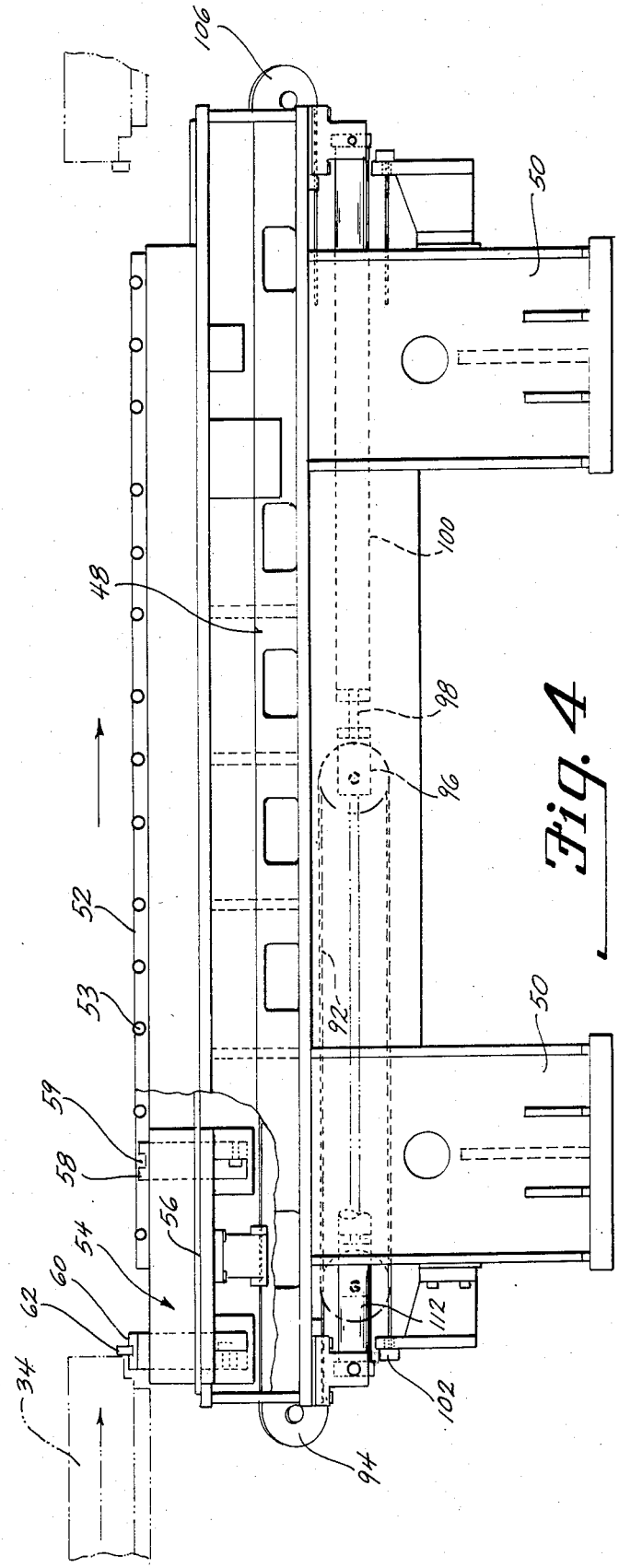

CLOSED LOOP MACHINING SYSTEM

CROSS-REFERENCE TO RELATED APPLICATIONS

This is a continuation of U.S. patent application Ser. No. 965,191 filed Nov. 30, 1978 which is a continuation in part of U.S. patent application Ser. No. 786,020 entitled "CLOSED LOOP MACHINING SYSTEM" which was filed in the U.S. Patent & Trademark Office on Apr. 8, 1977, both now abandoned.

BACKGROUND OF THE INVENTION

This invention relates to machine tool systems. In the past, machine tools have been either stand-alone machines or part of an automated machining system. The automated machining systems include a group of machines along with a workpiece transport system for transporting workpieces from one machine to the next in the machining system and control means for synchronizing the operation of all of the machine tools and the workpiece transport system.

Automated machining systems are very efficient but require high capital investment while stand-alone machines are much lower both in terms of capital investment and efficiency. One bottleneck for stand-alone machines is the problem of transferring workpieces onto the machine for machining and then transferring the finished workpiece to the next machine for the next machining operation. The principal object of this invention is to provide a simple machining system which solves the foregoing workpiece transfer problem but which is less expensive than the automated machining systems heretofore known in the art. Other objects and advantages of the invention will be apparent from the description which follows.

SUMMARY OF THE INVENTION

In accordance with this invention, the foregoing problem is solved by arranging a plurality of machine tools in a closed loop in which each machine tool is between the tool which comes before it and the tool which comes after it in the machining sequence. Workpiece transfer units are positioned adjacent to each machine tool for transferring the workpieces from one machine tool to the next in the machining sequence. An operator's station is provided for introducing unmachined workpieces into the loop and removing machined workpieces from the loop. The unmachined workpieces introduced into the loop at the operator's station are transferred from one machine tool to the next around the loop for machining and eventually return to the operator's station for unloading.

BRIEF DESCRIPTION OF THE DRAWINGS

FIG. 1 is a plan view of one preferred embodiment of the invention;

FIG. 2 is a plan view of one machine tool and the adjacent workpiece transfer units with the pallet on the machine tool worktable being in position to be transferred off the machine tool worktable;

FIG. 3 is a plan view similar to FIG. 2 but with the machine tool worktable empty and positioned to receive a new pallet;

FIG. 4 is a side elevation view, partially cut away, of one workpiece transfer unit;

FIG. 5 is a fragmentary end elevation view of the workpiece transfer unit shown in FIG. 4;

DESCRIPTION OF THE PREFERRED EMBODIMENTS

Figure 6:
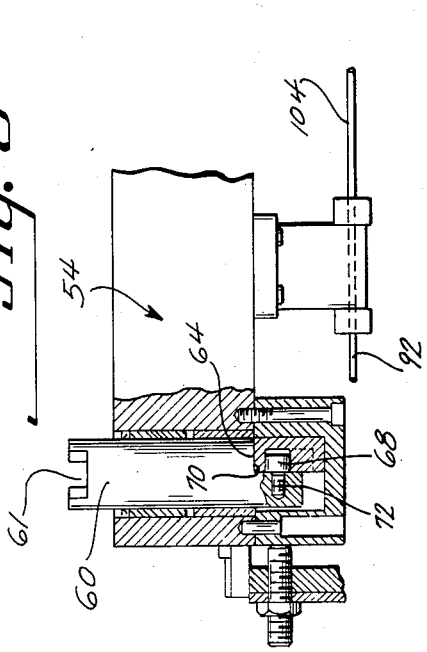
FIG. 6 is a fragmentary longitudinal sectional view taken on the line 6—6 of FIG. 5.

FIG. 1 is a plan view of one preferred embodiment of the invention which includes three machine tools 10, 12 and 14 and three workpiece transfer units 16, 18 and 20 arranged in a closed loop which in this particular case is triangular in shape but which could be any suitable polygon depending on the number of machine tools employed. Each of the machine tools 10, 12 and 14 has a corresponding worktable 22, 24 and 26 which is slidably mounted on a corresponding bed 28, 30 and 32. Each of the worktables 22, 24 and 26 are slidable along a horizontal axis and are indexable about a vertical axis perpendicular to the horizontal axis. Each worktable 22, 24 and 26 has horizontal guide means to slidably receive a pallet 34 carrying one or more workpieces 36, 38 and to clamp pallet 34 thereon so that workpieces 36,38 can be machined by machine tools 10, 12 and 14.

Machine tools 10, 12 and 14 can be any suitable prior art machine tool, such as the MILWAUKEE-MATIC 200 horizontal machining center manufactured by the Kearney & Trecker Corporation of Milwaukee, Wis. The MILWAUKEE-MATIC 200 is disclosed in a manual entitled "MILWAUKEE-MATIC 200 Machine Maintenance Manual, Publication 413G, Eighth Edition", published in January, 1977, by the Kearney & Trecker Corporation of Milwaukee, Wis. The entire contents of the above-identified maintenance manual is hereby incorporated into this patent application by reference.

Other suitable machine tools are disclosed in U.S. Pat. No. 3,587,390 which issued to Earl R. Lohneis et al on June 28, 1971 for an "INDEX AND TABLE DRIVE MEANS FOR A MACHINE TOOL"; U.S. Pat. No. 3,513,730 which issued to Earl R. Lohneis et al on May 26, 1970 for an "INDEXING MEANS FOR A MACHINE TOOL"; and U.S. Pat. No. 3,825,245 which issued to John G. Osburn et al on July 23, 1974 for a "WORKPIECE CHANGER MECHANISM FOR A MACHINE TOOL". The entire disclosures of the above-identified patents are hereby incorporated into this patent application by reference.

Workpiece transfer units 16, 18 and 20 each extend between two adjacent machine tools 10, 12 and 14 and are positioned on the legs of the triangle defined by machine tools 10, 12 and 14. Workpiece transfer units 16, 18 and 20 are positioned to interact with worktables 22, 24 and 26 in transferring pallets 34 from one worktable 22, 24, 26 to an adjacent worktable 22, 24, 26. To transfer a pallet 34 off one of the worktables 22, 24, 26, the worktable is moved along its bed to a location opposite the end of the appropriate workpiece transfer unit 16, 18, 20, as shown in FIG. 2 and is indexed about its vertical axis until the worktable pallet ways 40 (FIG. 3) are aligned with the corresponding transfer unit pallet ways 42 (FIG. 2) so that pallet 34 can be slid off of the worktable and onto the transfer unit. FIG. 2 shows the relative positions required to slide pallet 34 off of worktable 24 and onto transfer unit 18.

After pallet 34 is slid off of worktable 24, worktable 24 is indexed to align its pallet ways 40 with the pallet ways 44 of transfer unit 16, as shown in FIG. 3, so that it can receive another pallet 34 from transfer unit 16. In this particular example, the flow of pallets 34 is counter-clockwise in FIG. 1, although pallet flow in the opposite direction is equally feasible since the workpiece transfer units 16, 18 and 20 are adapted to move pallets 34 in either direction.

Pallets 34 are introduced into the closed loop system at an operator's station in the middle of transfer unit 16. An operator 46 places a pallet 34 carrying workpieces 36 and 38 on transfer unit 16 with conventional lifting devices (not shown). The pallet 34 is subsequently transferred counterclockwise around the loop first to machine tool 12, then to machine tool 14, then to machine tool 10, being machined at each machine tool. After all the machining has been completed, pallet 34 is returned to the operator's station on transfer unit 16 where it is removed by operator 46 and replaced by a pallet carrying unmachined workpieces. Alternately, only the workpieces 36 and 38 could be removed and replaced at the operator's station.

In this particular example, machine tools 12 and 14 are horizontal machining centers while machine tool 10 is a multiple spindle indexable turret. However, it will be understood by those skilled in the art that any combination of machine tools can be employed which have indexable worktables adapted to interact with workpiece transfer units to transfer workpieces onto and off of the worktables.

Figure 7:
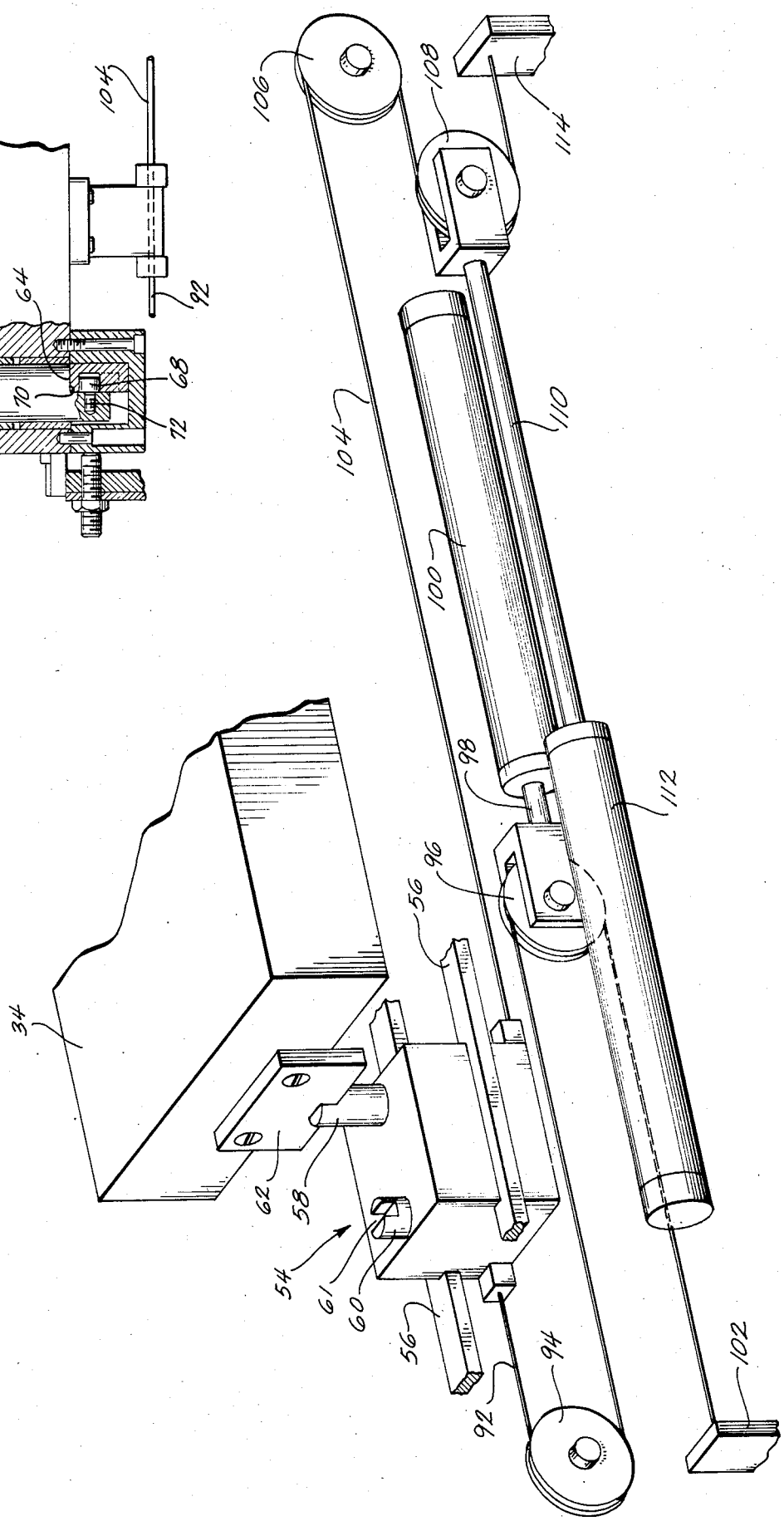
FIG. 7 is a diagrammatic perspective view showing the cables and hydraulic cylinders which move the workpiece transfer slide.

The construction of workpiece transfer units 16, 18 and 20 is illustrated in FIGS. 4 through 7. Referring to FIGS. 4 and 5, each transfer unit 16, 18 and 20 comprises a bed 48 which is supported by legs 50. A pair of spaced horizontal guide means or pallet ways 52 and aligned rollers 53 are supported on top of bed 48 for slidably receiving a pallet 34. A transfer slide 54, best shown in FIG. 7, is slidably mounted on rails 56 (FIG. 7) that extend the full length of bed 48. Transfer slide 54 carries a pair of extendable and retractable vertical posts 58 and 60 which are cylindrical in shape and are slotted on their upper end at 59 and 61 to engage lugs 62 on pallets 34 as best shown in FIG. 7. In FIG. 7, post 58 is shown in its extended position engaging lug 62 while post 60 is shown in its retracted position below the level of lug 62. In FIG. 4, post 60 is in the extended position engaging lug 62 while post 58 is in the retracted position. Post 60 is used to pull pallets 34 onto the transfer unit and post 58 is used to push pallets off of the transfer unit as described hereinafter.

Posts 58 and 60 are moved upwardly and downwardly between their extended and retracted positions by slidable cam plates 64 (FIG. 5) which extend transverse to posts 58 and 60 and have sloping cam slots 66 therein which engage cam rollers 68 attached to the bottom of posts 58 and 60, as best shown in FIG. 6 for post 60. Post 60 is notched at 70 (FIG. 6) to provide clearance for cam plate 64. Cam roller 68 is attached to the notched end of post 60 by a machine screw 72 and rides in cam slot 66 of cam plate 64. A similar mounting is used for the cam plate 64 and cam roller 68 on the bottom of post 58.

Posts 58 and 60 are raised by moving their cam plates 64 to the left in FIG. 5 to the position shown therein and are lowered by moving their cam plates 64 to the right in FIG. 5. The movement of cam plates 64 is caused by pairs of hydraulic cylinders 74 and 76 (FIG. 5) mounted on bed 48 and positioned opposite the locations where the pallet lugs 62 are to be engaged. Cylinders 74 and 76 move plungers 78 and 80, respectively, against the side edges of cam plates 64 when actuated to move cam plates 64 either to the left or to the right in FIG. 4, thereby either raising or lowering the corresponding post 58 or 60. Cylinders 74 and 76 are double-acting cylinders which are caused to extend or retract their plungers 78 and 80 by conventional control means which is not shown in the drawings. Cylinders 74 and 76 are actuated in paired opposition, i.e., when one plunger 78,80 is extended the other is retracted and vice versa. Conventional limit switches 82 and 84 are mounted opposite cylinders 74 and 76 and interact with bumpers 86 and 88 on the outer ends of plungers 78 and 80 to indicate whether plungers 78 and 80 are in their extended or retracted position. Limit switches 82 and 84 provide information for the transfer control means.

When cam plates 64 are moved to the left, in FIG. 4, to raise post 58 or 60 to the extended position, roller 68 enters a horizontal portion 90 (FIG. 5) of cam slot 66 at the upper end thereof which holds the corresponding post 58 or 60 in its extended position as transfer slide 54 is moved back and forth along bed 48.

Transfer slide 54 is moved by a hydraulically driven cable arrangement which is illustrated schematically in FIG. 7. A first cable 92 is attached to one end of transfer slide 54 and passes around a first fixed pulley 94 which is rotatably attached to transfer unit bed 48 and then passes around a movable pulley 96 which is rotatably attached to the plunger 98 of a hydrauic cylinder 100. Cylinder 100 is rigidly attached to transfer unit bed 48. After passing around movable pulley 96, cable 92 is attached to a bracket 102 on transfer unit bed 48.

On the other side of transfer slide 54, a second cable 104 is attached thereto and passes around a fixed pulley 106 which is rotatably attached to transfer unit bed 48 and then passes around a movable pulley 108 which is rotatably attached to the plunger 110 of a second hydraulic cylinder 112. Cylinder 112 is rigidly attached to transfer unit bed 48. After passing around movable pulley 108, cable 104 is attached to a bracket 114 on transfer unit bed 48.

Hydraulic cylinders 100 and 112 are both double-acting and are actuated in paired opposition to cause transfer slide 54 to move along transfer unit bed 48, i.e., when one of the hydraulic cylinders 100,112 is retracted, the other is extended by the same amount and vice versa. Hydraulic cylinders 100 and 112 are operated by conventional control means which is not shown in the drawings.

To draw a pallet 34 onto the transfer unit, transfer slide 54 is moved to the end of transfer unit bed 48 adjacent to pallet 34, as shown in FIG. 4. Hydraulic cylinders 74 and 76 are then actuated to raise post 60 and engage it with lug 62. Hydraulic cylinders 100 and 112 are then actuated to draw pallet 34 onto and across the transfer unit. When transfer slide 54 reaches the other end of the transfer unit, post 60 is lowered and transfer slide 54 is repositioned to place post 58 under the lug 62 at the other end of pallet 34. Post 58 is then raised to engage lug 62 and transfer slide 54 is moved to push pallet 34 off the transfer unit. The pallet 34 is drawn onto the transfer unit by post 60 and is pushed off by post 58. However, if desired, the direction of transfer can be reversed, and if so, the pallet 34 will be drawn onto the transfer unit by post 58 and will be pushed off by post 60.

The hydraulic control means which cause the above-described movements of transfer slide 54 and posts 58 and 60 is conventional, and hence, is not shown in the drawings.

Figure 8:
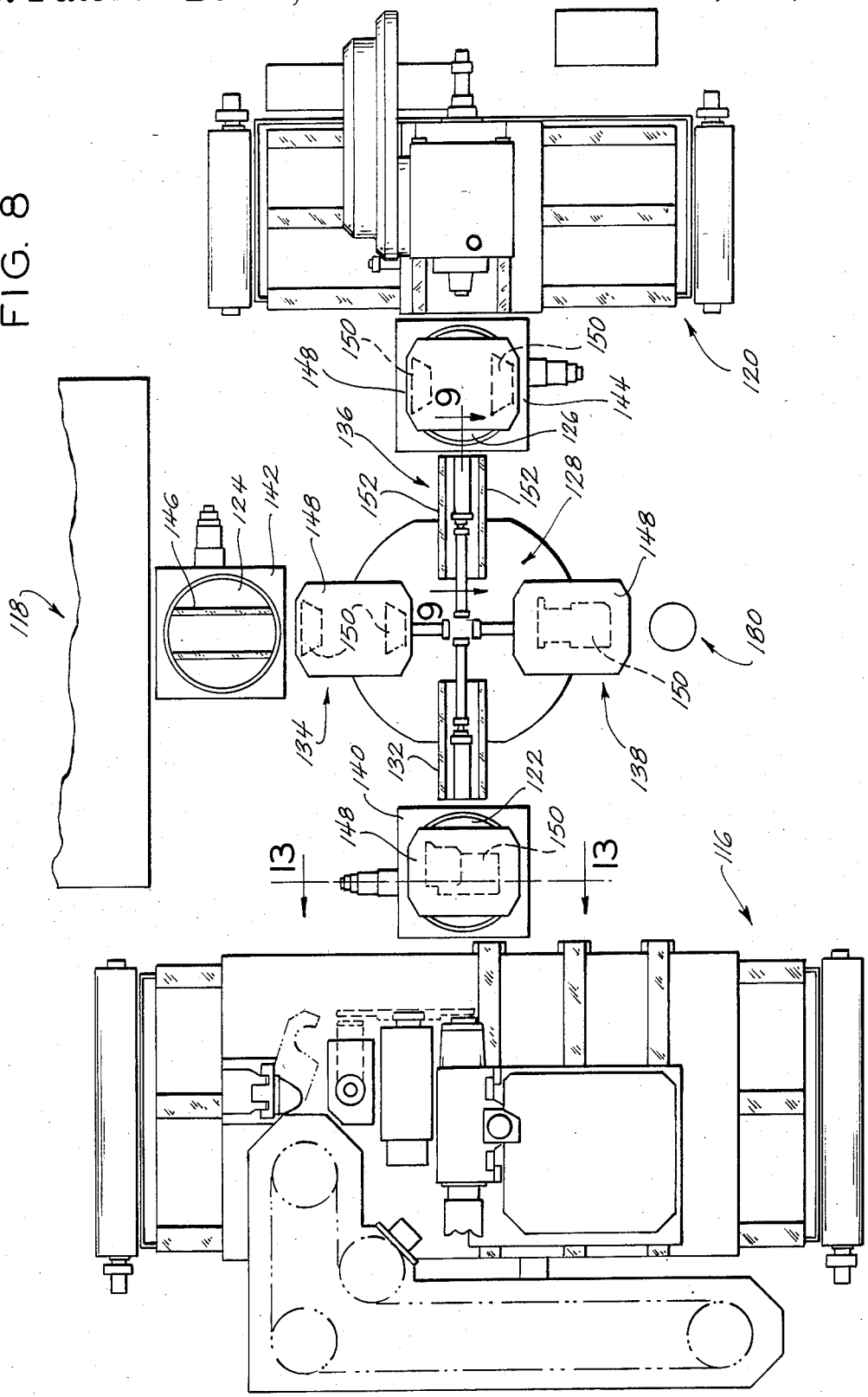
FIG. 8 is a plan view of a second preferred embodiment of the invention.

FIGS. 8 to 13 show a second preferred embodiment of the invention in which three machine tools 116, 118 and 120, each of which has a corresponding worktable 122, 124 and 126, are positioned around a pallet carousel 128, as shown in FIG. 8. Pallet carousel 128 is rotatably mounted on a base 130 (FIG. 9) by conventional means (not shown) and has four workpiece transfer units 132, 134, 136 and 138 which are spaced at 90° positions around the center of carousel 128 in position to interact with worktables 122, 124 and 126. Each of the worktables 122, 124 and 126 is rotatably mounted on a corresponding base 140, 142 and 144 by conventional means (see FIG. 13) and each has conventional horizontal guide means 146 to slidably receive a pallet 148 and has conventional clamp means (not shown) to clamp pallet 148 thereto. Workpieces 150 can be clamped to pallets 148 by conventional means (not shown). Each worktable 122, 124 and 126 can be rotated through 360°.

Workpiece transfer units 132, 134, 136 and 138 are positioned in operative relation with the horizontal guide means 146 on worktables 122, 124 and 126 so that pallets 148 can be slid from any one of the workpiece transfer units 132, 134, 136 and 138 to any one of the worktables 122, 124 and 126 and vice versa. The pallets 148 are slid from a worktable 122, 124 or 126 to workpiece transfer units 132, 134, 136 or 138 by a hydraulic piston and cylinder mechanism 156 described below.

The details of workpiece transfer unit 136 are shown in FIGS. 8 to 12.

Figure 9:
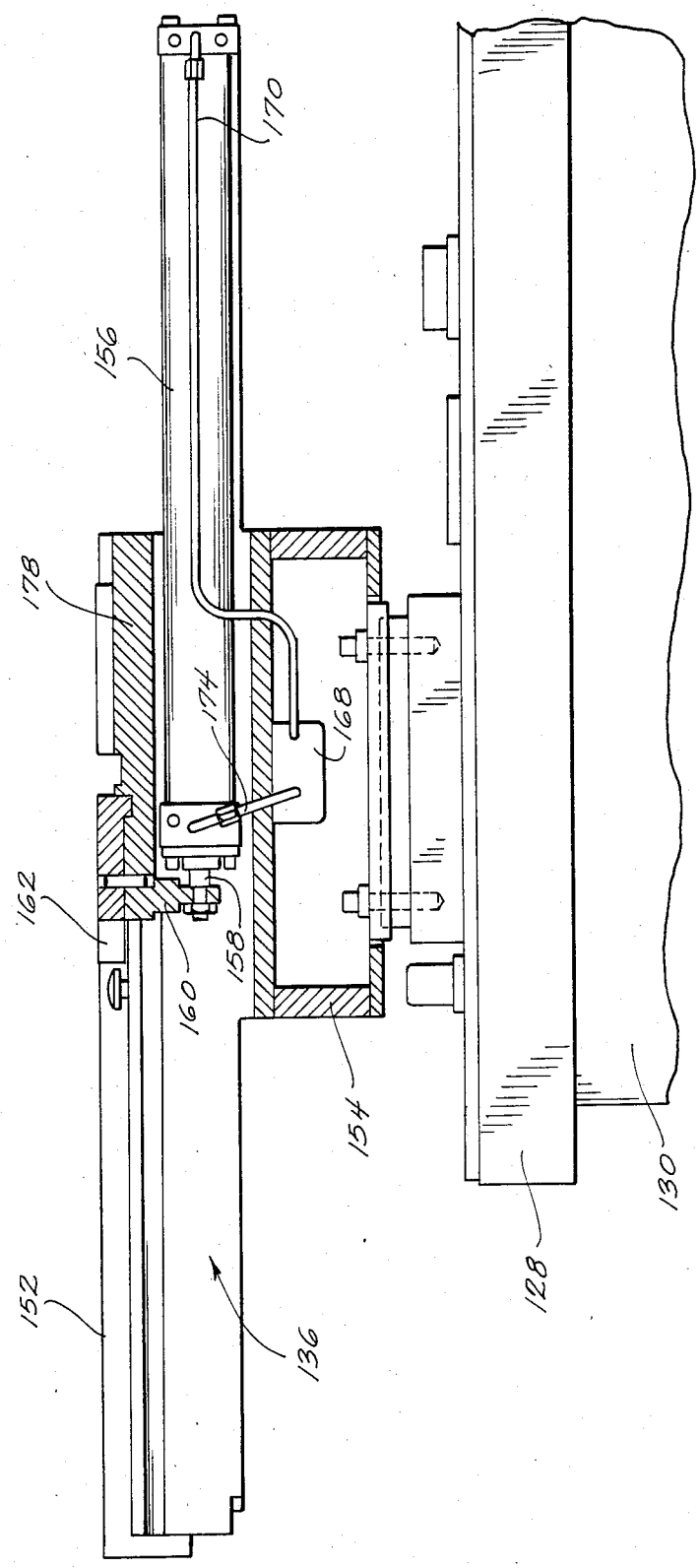
FIG. 9 is a longitudinal sectional view taken on the line 9—9 in FIG. 8.

Referring to FIGS. 8 and 9, a pair of horizontal ways 152 are mounted on a base 154 to slidably receive pallets 148. Base 154 is rigidly mounted on carousel 128 by conventional means and rotates therewith. A hydraulic piston and cylinder mechanism 156 is mounted on base 154 by conventional means. Hydraulic piston and cylinder mechanism 156 has a piston rod 158 to which a bracket 160 is attached. Bracket 160 has a forwardly extending portion 162 which is T-shaped (see FIG. 10) and which engages a T-shaped slot 164 in a bracket 166 attached to the bottom of pallet 148 (see FIGS. 11 and 12).

Figure 10:
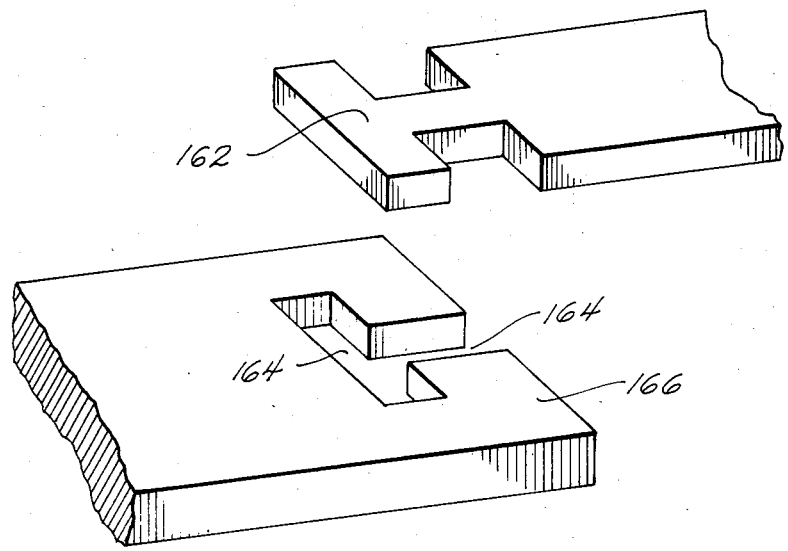
FIG. 10 is a fragmentary perspective view of the T-shaped transfer lug on a workpiece transfer unit and the matching T-shaped slot in a transfer bracket attached to a pallet.
Figure 11:
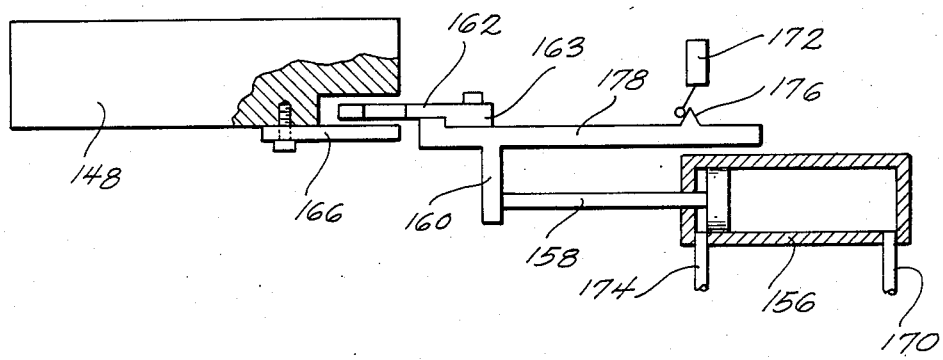
FIG. 11 is a diagrammatic longitudinal sectional view of the hydraulic piston and cylinder mechanism on a workpiece transfer unit, the transfer lug thereof being positioned above a T-shaped slot in a transfer bracket on a pallet.
Figure 12:
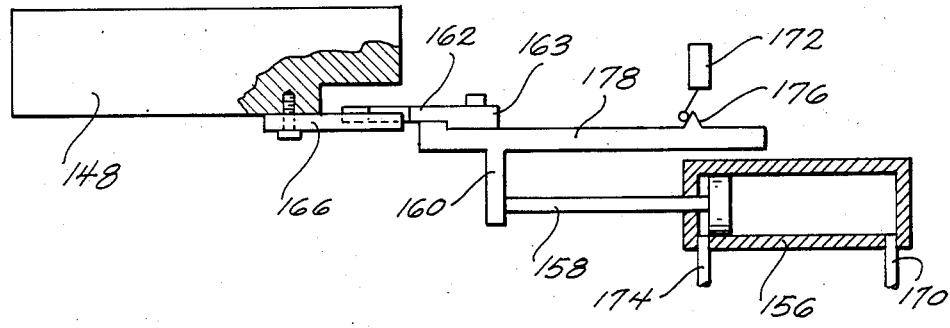
FIG. 12 is a diagrammatic longitudinal sectional view similar to FIG. 11 with the pallet raised to engage the transfer lug in the transfer bracket.

To engage the T-shaped end 162 of bracket 160 with the T-shaped slot 164 in bracket 166, hydraulic piston rod 158 is extended, as shown in FIGS. 10 and 11, to place T-shaped end 162 over T-shaped slot 164. This is done by pumping hydraulic fluid into hydraulic piston and cylinder mechanism 156 by conventional hydraulic pump means 168 (FIG. 9) through conduit 170 to fully extend piston rod 158. At the full extension of piston rod 158, limit switch 172 (FIG. 11) is actuated by a lug 176 on a rearwardly extending portion 178 of bracket 160 and terminates the flow of hydraulic fluid by conventional means not shown. After piston rod 158 has been fully extended, with T-shaped end portion 162 being aligned with T-shaped slot 164, as shown in FIGS. 10 and 11, the worktable holding pallet 148 is raised by means described hereinafter to engage bracket 162 with bracket 166, as shown in FIG. 12.

To slide pallet 148 from the worktable to workpiece transfer 136, hydraulic fluid is then pumped into hydraulic piston and cylinder mechanism 156 by hydraulic pump means 168 through conduit 174 to retract piston rod 158 and draw pallet 148 onto ways 152. When piston rod 158 is fully retracted, a shoulder portion 163 (FIG. 11) of bracket 160 strikes limit switch 172 and terminates the flow of hydraulic fluid by conventional means not shown. This places pallet 148 on workpiece transfer unit 136.

The above-described movements are reversed to push pallet 148 back onto one of the worktables 122, 124 or 126.

In the operation of the embodiment shown in FIG. 8, pallets 148 carrying workpieces 150 are loaded one at a time on workpiece transfer units 132, 134, 136 and 138 at an operator's station 180. The pallets are then positioned opposite the desired worktable 122, 124 or 126 by rotating carousel 128 through 90° increments by conventional rotary drive means (not shown) which can be similar to the rotary drive shown in FIG. 13. The pallets 148 are then loaded on the desired worktables, as described above, for machining of the workpieces 150. When all of the machining operations have been completed, the pallets 148 are loaded back onto the workpiece transfer units 132, 134, 136 and 138, as described above, and pallet carousel 128 is rotated through 90° to move each pallet 148 to the next position around the loop of machine tools. The pallet that is moved into operator's station 180 carries a finished workpiece 150 which is removed from its pallet 148 and is replaced by an unmachined workpiece.

Figure 13:
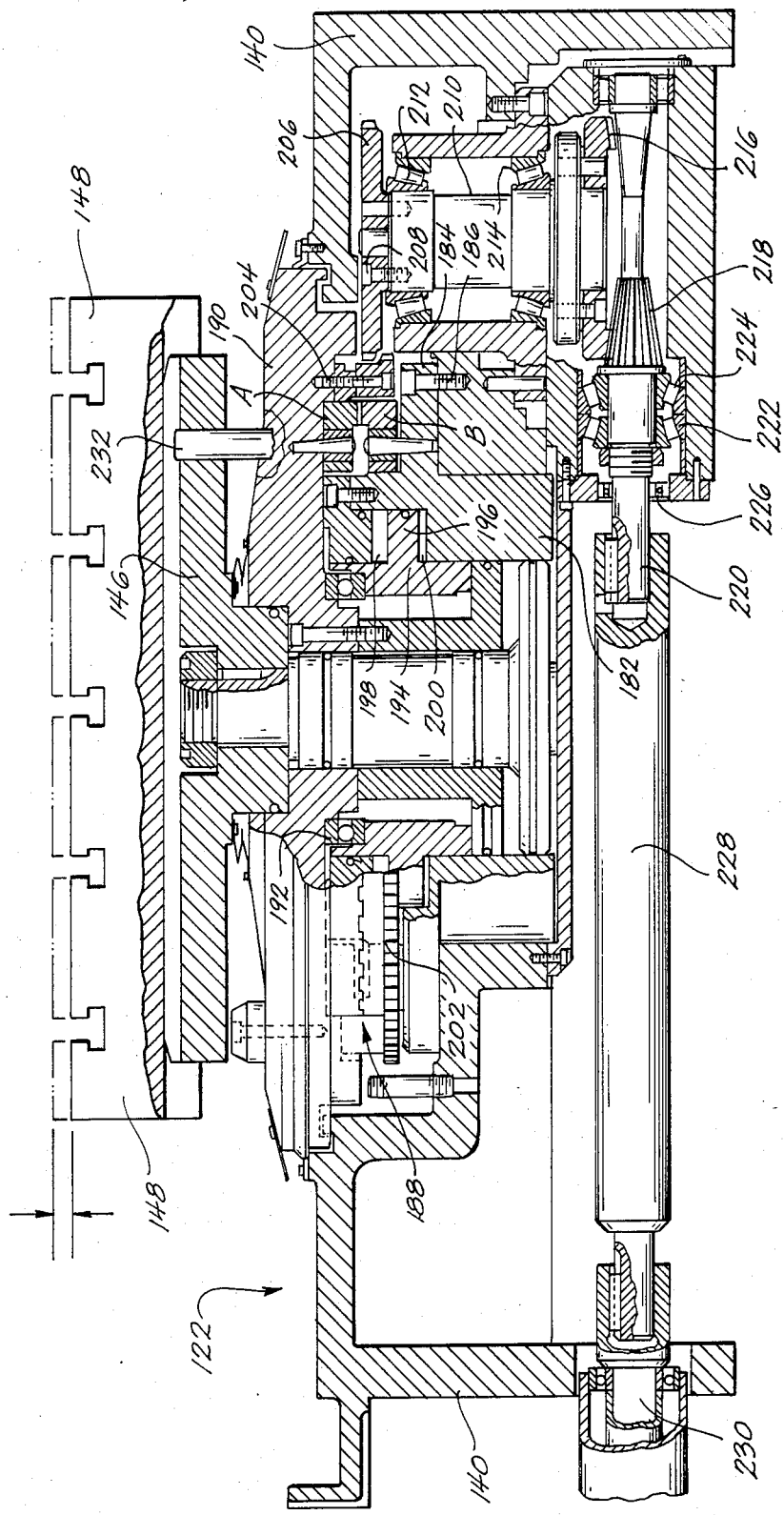
FIG. 13 is a cross-sectional view of a worktable taken on the line 13—13 of FIG. 8.

FIG. 13 shows the details of worktable 122 and its base 140. The base 140 is a recessed steel casting within which an index cylinder 182 is seated. Index cylinder 182 has an outwardly extending flange 184 which is bolted to a portion of base 140 by bolts 186. Flange 184 supports a rotary indexable coupling 188 which has an upper ring A and a lower ring B which are both serrated and are designed to come together at any one of a plurality of precisely located angular increments. Ring A is rigidly attached to worktable top 190 and rotates therewith, while ring B is rigidly attached to stationary index flange 184. To rotate top 190, it is necessary to first lift it to disengage ring A from ring B. After top 190 is rotated to the desired angular position, it is lowered, and as ring A engages ring B, top 190 is rotated slightly to bring it into alignment with one of the precise angular increments of indexable coupling 188.

Top 190 is rotatably mounted on top of index cylinder 182 by means of bearing 192 which rests on top of a hollow cylindrical hydraulic piston 194. Piston 194 has a flange 196 whose upper and lower surfaces are boundaries of adjacent hydraulic chambers 198 and 200 into which hydraulic fluid can be pumped to move piston 194. The lower boundary of chamber 200 is the inner shoulder of index cylinder 182, which supports piston 194. To raise piston 194 and top 190, hydraulic fluid is pumped into chamber 200 and is exhausted from chamber 198. Hydraulic fluid is pumped into and exhausted from chambers 198 and 200 by conventional means not shown.

When worktable top 190 is raised, a ring gear 202, which is attached to top 190 by bolts 204, engages a spur gear 206. Spur gear 206 is attached by bolts 208 to a shaft 210 which is journalled to worktable base 140 by bearings 212 and 214. At its lower end, shaft 210 is connected to a spiroid gear set comprising a spiroid ring gear 216 and a spiroid pinion gear 218. Spiroid pinion gear 218 is attached to a shaft 220 which is journalled to worktable base 140 by bearings 222, 224 and 226. Shaft 220 is coupled to shaft 228 which, in turn, is coupled to shaft 230. Shaft 230 is coupled to a servo motor (not shown) by conventional means not shown. When shaft 230 is rotated by the servo motor, it causes rotation of worktable top 190 via gears 218, 216, 206 and 202. Rotation of worktable top 190 also rotates horizontal guide means 146 which is connected to worktable top 190 by dowel 232. Pallet 148 rotates with horizontal guide means 146.

Although the illustrative embodiments of the invention have been described in considerable detail for the purpose of fully disclosing practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. A machining system comprising at least three stand alone numerically controlled machine tools in spaced relationship so that each is located at one of the vertices of a closed polygonal loop each of said machine tools being controlled by its own dedicated control circuit which is independent of the other machine tool controls in the system; a worktable rotatably supported by each of said machine tools for rotation about a vertical axis with each table operating under the control of the circuit dedicated to the machine by which said table is supported; a loading and unloading station; guide means on said landing and unloading station for slidably receiving workpiece supports; worktable guide means on each of said worktables for slidably receiving workpiece supports; a workpiece transfer slide for each of the machine tools of the system and for said loading and unloading station, each workpiece transfer slide lying along a separate one of the sides of said closed polygonal loop; guide means on each of said workpiece transfer slides for slidably receiving workpiece supports and mounted in position to cooperate with said worktable guide means as well as the guide means on said loading and unloading station; workpiece moving means in each of said workpiece transfer slides for sliding a workpiece support off of a worktable of one of said machine tools or off of the guide means of said loading and unloading station and onto the guide means of its associated transfer slide to move the workpiece support along said guide means across its associated transfer slide and off of its associated transfer slide onto the worktable of another machine tool for the performance of another machining operation or onto the loading and unloading station.

2. The machining system according to claim 1 wherein each workpiece transfer slide includes means for pulling a workpiece support onto said transfer slide from one adjacent worktable and for pushing said workpiece support off of said transfer slide and onto the other adjacent worktable.

* * * * *